(12) United States Patent
James

(10) Patent No.: US 9,655,357 B2
(45) Date of Patent: May 23, 2017

(54) VACUUM TRAP

(71) Applicant: Brad James, Raymond (CA)

(72) Inventor: Brad James, Raymond (CA)

( * ) Notice: Subject to any disclaimer, the term of this patent is extended or adjusted under 35 U.S.C. 154(b) by 310 days.

(21) Appl. No.: 14/150,854

(22) Filed: Jan. 9, 2014

(65) Prior Publication Data

US 2015/0020436 A1 Jan. 22, 2015

(30) Foreign Application Priority Data

Jul. 17, 2013 (CA) .................... 2821183

(51) Int. Cl.
*A01M 23/14* (2006.01)
*A01M 1/06* (2006.01)
*A01M 23/02* (2006.01)

(52) U.S. Cl.
CPC .............. *A01M 23/14* (2013.01); *A01M 1/06* (2013.01); *A01M 23/02* (2013.01)

(58) Field of Classification Search
CPC ...... A01M 23/00; A01M 23/02; A01M 23/08; A01M 23/12; A01M 23/14; A01M 1/06; A01M 1/08
USPC ...................................... 43/58, 139
See application file for complete search history.

(56) References Cited

U.S. PATENT DOCUMENTS

| | | | | |
|---|---|---|---|---|
| 3,750,327 A * | 8/1973 | Thybault | ................. | A01M 1/06 43/139 |
| 4,074,458 A * | 2/1978 | Catlett | .................... | A01M 1/06 15/344 |
| 4,141,174 A * | 2/1979 | Smith | ..................... | A01M 1/06 43/139 |
| 4,175,352 A * | 11/1979 | Catlett | .................... | A01M 1/06 15/342 |
| 4,566,218 A * | 1/1986 | Kurosawa | ............ | A01M 23/18 43/58 |
| 4,733,495 A * | 3/1988 | Winnicki | ............. | A01M 3/005 43/134 |
| 5,040,326 A * | 8/1991 | Van Dijnsen | ........ | A01M 23/02 43/139 |
| 5,052,147 A * | 10/1991 | Broomfield | .......... | A01M 3/005 43/139 |
| 5,400,543 A * | 3/1995 | Ideker, Jr. | .............. | A01M 1/06 134/21 |
| 5,452,539 A * | 9/1995 | Kurosawa | ............ | A01M 23/12 43/58 |
| 5,926,997 A * | 7/1999 | Wilcox | ................. | A01M 1/026 43/121 |

(Continued)

FOREIGN PATENT DOCUMENTS

EP 0159634 * 10/1985
JP 4970124 B2 * 7/2012

*Primary Examiner* — Darren W Ark
*Assistant Examiner* — Magdalena Topolski
(74) *Attorney, Agent, or Firm* — Davis & Bujold PLLC; Michael J. Bujold

(57) ABSTRACT

A vacuum trap has a vacuum chamber and a conduit having at least one first opening open to atmosphere and a second opening connected to the vacuum chamber. A valve connects the conduit to the vacuum chamber and seals the vacuum chamber. A vacuum source maintains a vacuum inside the vacuum chamber immediately prior to the valve opening, the vacuum being sufficient to draw a vermin through an opening of the conduit. A detector detects the presence of vermin, the valve opening in response to a signal from the detector when vermin are detected.

10 Claims, 5 Drawing Sheets

(56) References Cited

U.S. PATENT DOCUMENTS

| | | | |
|---|---|---|---|
| 6,202,343 B1* | 3/2001 | Mah | A01M 3/005 |
| | | | 43/112 |
| 6,226,919 B1* | 5/2001 | Septer | A01M 1/06 |
| | | | 43/139 |
| 7,441,368 B1 | 10/2008 | Rieger | |
| 8,701,338 B1* | 4/2014 | Walsh, Jr. | A01M 23/12 |
| | | | 43/139 |
| 8,701,339 B1* | 4/2014 | Walsh | A01M 23/12 |
| | | | 43/139 |
| 2002/0108296 A1* | 8/2002 | Kleinhenz | A01M 1/023 |
| | | | 43/139 |
| 2006/0248786 A1* | 11/2006 | Wolf | A01M 3/005 |
| | | | 43/139 |
| 2012/0137569 A1* | 6/2012 | Younts | A01M 3/005 |
| | | | 43/139 |
| 2013/0014429 A1* | 1/2013 | Meskouris | A01M 1/2094 |
| | | | 43/139 |

* cited by examiner

VACUUM TRAP

TECHNICAL FIELD

This relates to a device used to entrap vermin, and more specifically a device using a vacuum.

BACKGROUND

Vacuum-based vermin traps currently available do not keep a consistent vacuum on standby. Motors must first trigger and escape inertia which may cause valuable time to be lost when attempting to entrap a larger vermin. Vacuum-based vermin traps currently available are built to be stand-alone units that contain everything needed to operate within themselves. The inflexibility of this stand-alone trap setup becomes inconvenient when vermin control is needed across large areas, such as an industrial shop. An entrapment device that features instantaneous vacuuming and enough flexibility to be situated over a large area is desired.

SUMMARY

According to an aspect, there is provided a vacuum trap that has a vacuum chamber. There is a conduit having at least one first opening open to atmosphere and a second opening connected to the vacuum chamber. A valve connects the conduit to the vacuum chamber and seals the vacuum chamber. A vacuum source maintains a vacuum inside the vacuum chamber immediately prior to the valve opening. The vacuum is sufficient to draw a vermin through an opening in the conduit. A detector detects the presence of vermin, and the valve opens in response to a signal from the detector when vermin are detected.

In another aspect, the vacuum trap may further comprise a channel connected to the first opening, the channel being open to atmosphere to define a vermin run.

In another aspect, the vacuum source may be a vacuum pump.

In another aspect, the detector may be located within the channel and placed anywhere throughout the vermin run.

In another aspect, the detector may be an infrared sensor.

In another aspect, the detector may send a signal to a control box, the control box controlling the position of the valve and tracking statistics of the detector's activity.

In another aspect, the valve may be opened and closed by a valve actuator.

In another aspect, the vacuum chamber may comprise a vermin collection chamber. The vermin collection chamber may be removable or may have a cleanout opening.

In another aspect, a plurality of vacuum chambers may be connected to the vacuum source.

In another aspect, a plurality of conduits may be connected to the vacuum chamber.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
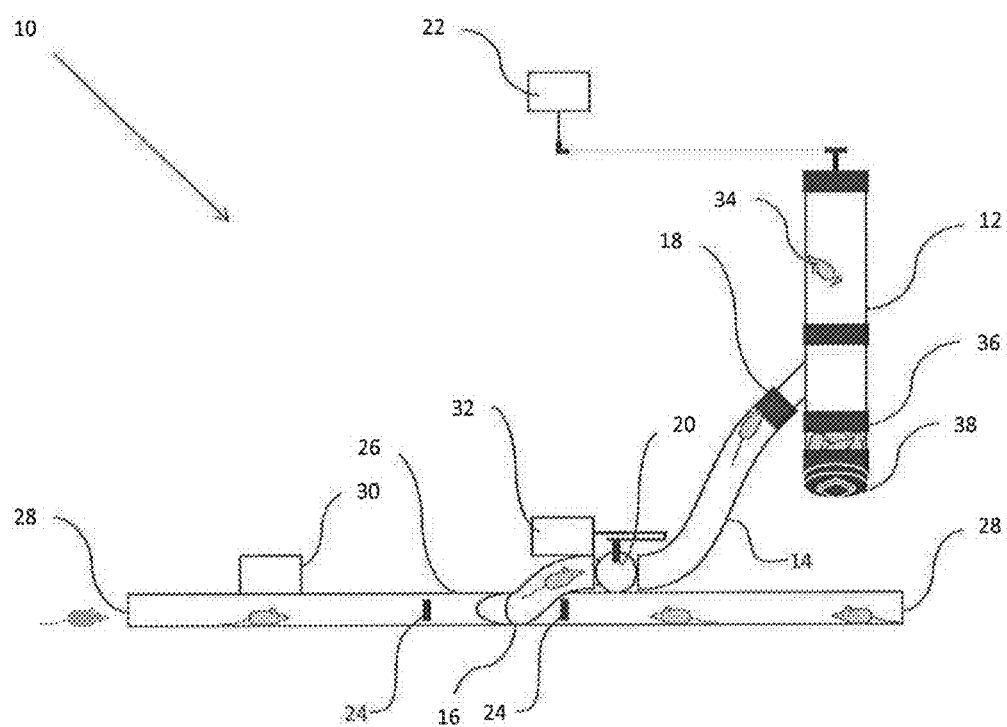
FIG. 1 is a side elevation view of a vacuum trap.

A vacuum trap generally identified by reference numeral 10 will now be described with reference to FIG. 1 through 5. Vacuum trap 10 described herein is particularly designed to capture mice; however, it will be understood that it could also be used against other types of vermin, such as rats, cockroaches, etc. in doing so, it may be necessary to adjust the dimensions and specifications of the equipment in order to accommodate the different sizes, weights and behaviours.

Figure 2:
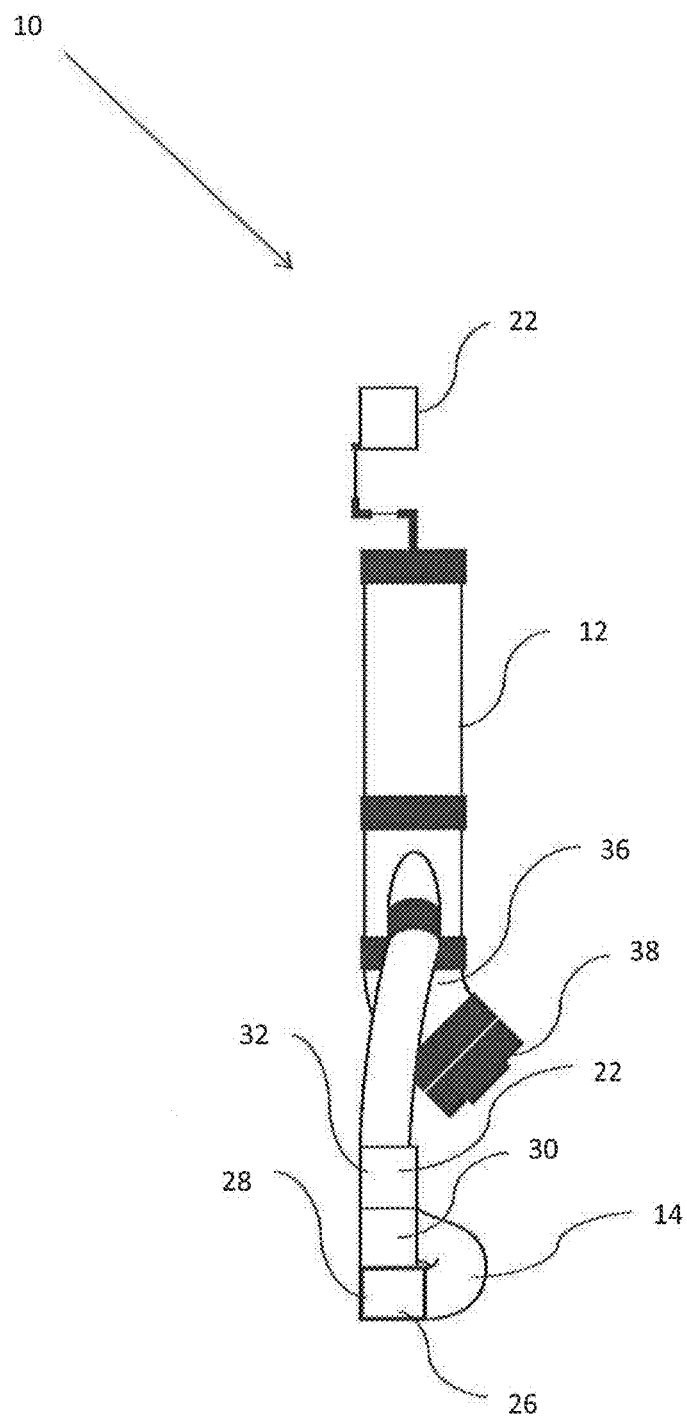
FIG. 2 is an end elevation view of the vacuum trap shown in FIG. 1.

Structure and Relationship of Parts:

Referring to FIGS. 1 and 2, vacuum trap 10 has a vacuum chamber 12 that retains the vacuum used to capture vermin and also preferably collects the vermin. A conduit 14 is open to atmosphere at a first end 16 and is connected to vacuum chamber 12 at a second end 18. Vacuum chamber 12 is sealed by a valve 20 within conduit 14. This allows a vacuum source 22 to maintain a vacuum in vacuum chamber 12 in anticipation of a detection event.

A detector 24 detects the presence of vermin adjacent to first end 16 of conduit 14. Detectors 24 could be any known type of proximity detector appropriate for detecting vermin such as infrared or optical sensors, detectors based on weight, etc. Detectors 24 and first end 16 of conduit 14 are preferably located in a high traffic or high risk location for vermin. As shown, there are two detectors 24, one on each side of first end 16 of conduit 14. The number and placement of detectors 24 will depend on the actual design.

In the depicted example, detectors 24 and first end 16 of conduit 14 are located within a vermin run 26. For example, vermin run 26 may be placed along the base of a wall. Vermin run 26 may be an independently enclosed conduit, or may be formed using the wall and floor. Preferably, vermin run 26 will be designed to mimic the preferences of the vermin being trapped. The depicted vermin run 26 has openings 28 at either end. Detectors 24 are preferably located within vermin run 26 to detect when the vermin 34 are in the proximity of first end 16. The required distance from first end 16 will depend on various factors, such as the vacuum applied, the flow area through conduit 14 and outside of conduit 14, the length of conduit 14, the size and weight of vermin 34, etc.

Once vermin 34 is detected, detectors 24 send a signal to open valve 20. As depicted, detectors 24 first relay information to a control box 30, which operates a valve actuator 32 to open and close valve 22. Control box 30 may also be used to record statistics related to detection events from detectors 24 and give an indication of the number of vermin being captured. This also allows an alarm to be sounded either when a vermin is captured, or when a sufficient number have been captured that vacuum trap 10 requires servicing.

Rather than using a control box 30, valve 20 may be opened and closed in any known manner. It is anticipated that valve 20 will be kept open for no more than 3 seconds, although the actual time will depend on the specifications of a particular unit. Valve 20 may have a valve controller that maintains valve 20 in the open position for the desired amount of time. Valve 20 may be any suitable type of valve and actuator 32 may be a separate device or integrally limped with valve 20. Preferably, valve 20 is a design with an open bore to increase the amount of room that vermin 34 can pass along, such as a ball valve or a gate valve. A ball valve is preferred as it is relatively compact, allows for a good seal when closed, and can be designed to open quickly.

When valve 20 opens, it releases a vacuum within vacuum chamber 12 that is created by vacuum source 22. This vacuum pressure draws in the vermin 34, such as a mouse 34 as depicted. Mouse 34 could be other undesirable vermin, such as rats or cockroaches. The vacuum pressure is sufficient to draw mouse 34 into and through conduit 14 and into vacuum chamber 12. Captured mice 34 are deposited in a vermin collection chamber 36, which is depicted as being part of vacuum chamber 12. It will be understood that vermin collection chamber 36 could be separate from vacuum chamber 12. For example, vermin collection chamber 36 may be positioned along conduit 14 and vermin may be redirected into collection chamber 36 by a grating that allows air to pass but not vermin. Vermin collection chamber 36 is preferably accessible by a cleanout opening 38. Cleanout opening 38 may be opened from the bottom in order to remove vermin 34 collected within. Alternatively, vermin collection chamber 36 may have a removable container similar to household built-in vacuum cleaners that is generally removed by releasing latches. Other methods of emptying vermin collection chamber 36 will be recognized by those skilled in the art.

After a predetermined time, valve 20 will close and vacuum source 22 will apply vacuum pressure to vacuum chamber 12 in anticipation of the next detection event. There may be a sensor to detect the pressure within vacuum chamber 12 (not shown) that communicates with control box 30 to indicate when vacuum chamber 12 is sufficiently recharged to capture another vermin 34. Alternatively, control box 30 or valve 20 may be programmed to wait a certain period of time before being able to open again, which allows the vacuum within vacuum chamber 12 to reach a certain level. This prevents valve 20 from being opened prematurely with insufficient force to capture vermin 34.

As described, vacuum chamber 12 is pre-charged with a vacuum that is released when a detection event occurs. This allows for a much more rapid response to a detection event and increases the likelihood that vermin 34 will be captured. It also acts to asphyxiate any vermin within collection chamber 36. As a result of this arrangement, vacuum source 22 does not necessarily need to be capable of a high volume of air flow, but simply enough to evacuate vacuum chamber 12 to a sufficient degree and in sufficient time to reset vacuum trap 10. The amount of vacuum stored within vacuum chamber 12 may be adjusted by either making vacuum chamber 12 larger or by pumping vacuum chamber 12 down to a lower pressure. Vacuum source 22 may be constantly on, or may be triggered when an increased air pressure is sensed.

Figure 3:
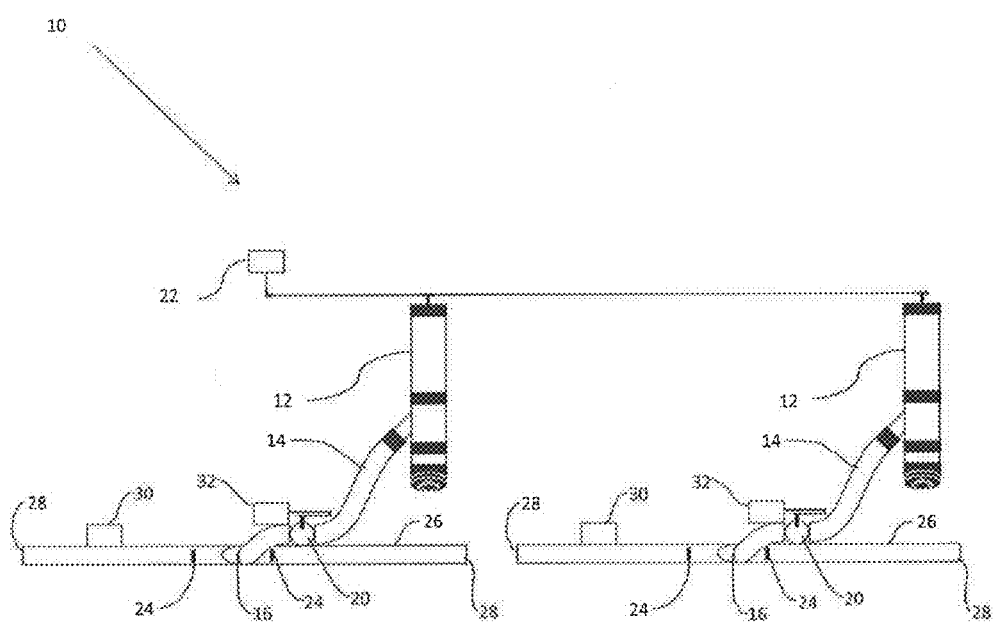
FIG. 3 is a side elevation view of a variation of a vacuum trap.
Figure 4:
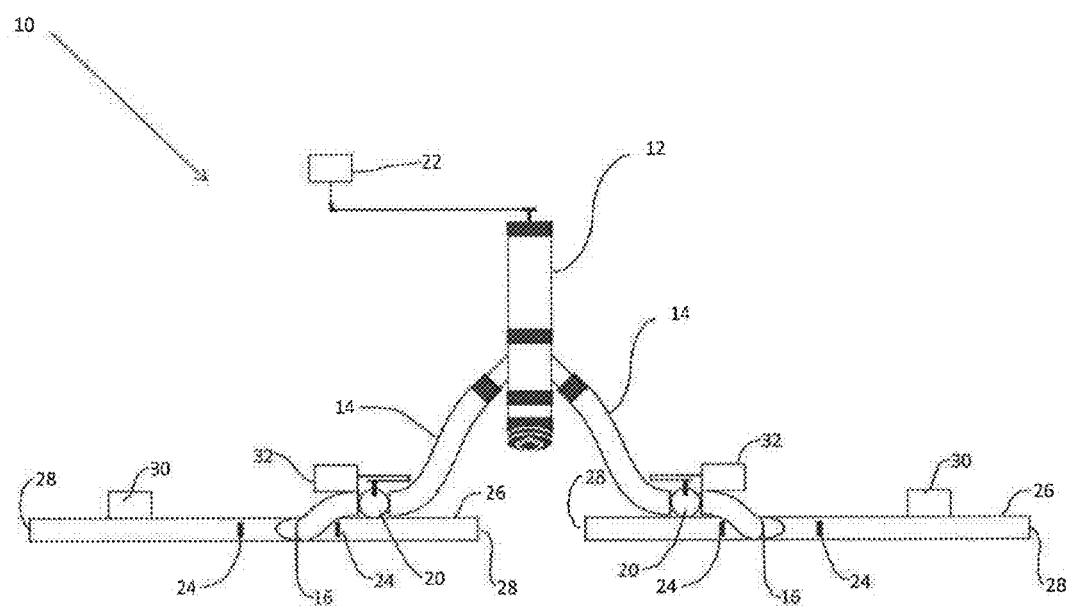
FIG. 4 is a side elevation view of a variation of a vacuum trap.
Figure 5:
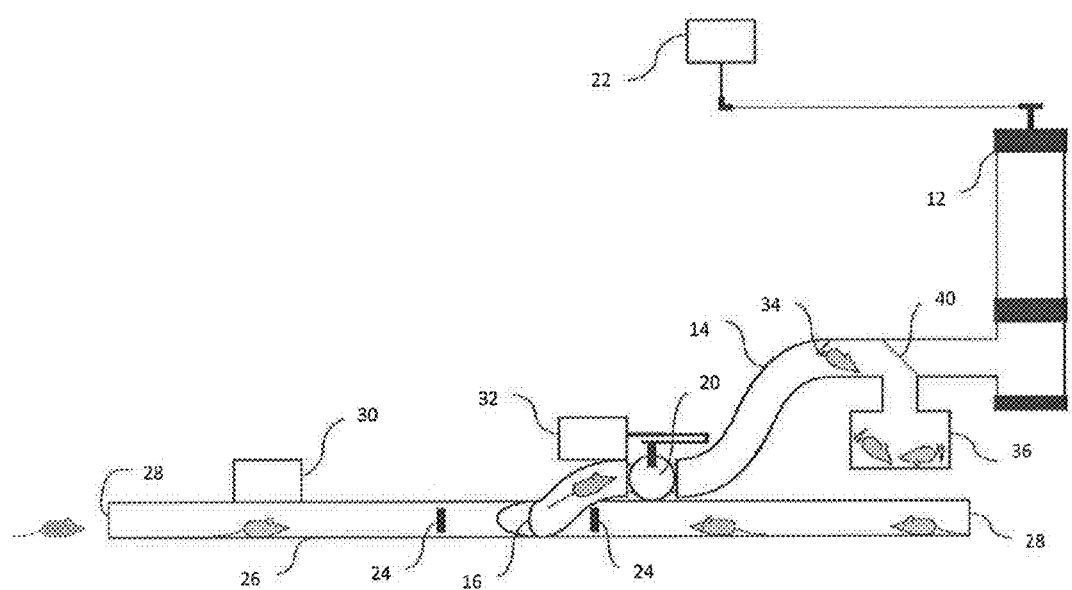
FIG. 5 is a side elevation view of a variation of a vacuum trap.

In the embodiment shown, vacuum trap 10 has one vacuum source, one vacuum chamber and one conduit. It will be understood that there may be more of any of these components. For example, any number of vacuum sources 22 could be used to maintain a vacuum in any number of vacuum chambers 12, which may connect to more than one conduit 14. Referring to FIG. 3, an example of a vacuum trap 10 having multiple vacuum chambers 36 connected to a single vacuum source 22 is shown. This may require particular valves 20 to open when a particular vacuum chamber 12 is triggered to prevent the vacuum from all chambers 12 from being released. In another example, referring to FIG. 4, vacuum trap 10 has multiple conduits 14 connected to vacuum chamber 12. Each conduit 14 has a valve 20 that opens in response to a detection event from the associated detectors 24. This may be useful in order to reduce the necessary equipment while still capturing vermin at various locations. In another example, referring to FIG. 5, vacuum trap 10 has vermin collection chamber 36 located between vacuum chamber 12 and valve 20 along conduit 14. A screen 40 or grate allows air to pass along conduit 14 while stopping vermin 34, which are directed into vermin collection chamber 36. This may be useful in cases where conduit 14 is quite long, and the vacuum stored within vacuum chamber 12 by vacuum source 22 is insufficient to draw vermin 34 the full length of conduit 14.

Operation:

An example of the capture process for one embodiment of vacuum trap 10 to capture mice will now be given. It will be understood that the process and details for other embodiments will depend on the preferences of the user, the specific design of vacuum trap 10, and the vermin being captured. Referring to FIGS. 1 and 2, mouse 34 will enter vermin run 26 through entrance 28. Continuing along vermin run 26, the vermin's presence will be detected by detectors 24. Detectors 24 will send a signal to control box 30, which will instruct valve actuator 32 to open valve 20. Vacuum source 22 maintains a vacuum in vacuum chamber 12. When valve 20 opens access to vacuum chamber 12, the vacuum caused by vacuum source 22 causes mouse 34 to be drawn into conduit 14. Mouse 34 then travels through valve 20 into vacuum chamber 12 and arrives in vermin collection chamber 36. After a length of time, generally between 1-3 seconds, control box 30 will instruct valve actuator 32 to close valve 20. Asphyxiated mouse 34 will then be removed from vacuum chamber 12 by removable cleanout opening 38.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A method of trapping vermin, the method comprising:
attaching a conduit to a vacuum chamber, the conduit having at least one first opening open to atmosphere and a second opening connected to the vacuum chamber, the at least one first opening being positioned within an enclosed vermin run defined by a channel, the enclosed vermin run comprising a first vermin run opening at a first end of the channel and a second vermin run opening at a second end of the channel, the second vermin run opening being in line with the first vermin run opening, and the enclosed vermin run being in line with each of the second vermin run opening and the first vermin run opening, and the at least one first opening being disposed between the first vermin run opening and the second vermin run opening;

positioning the channel along a base of a wall such that the first vermin run opening, the second vermin run opening, and the enclosed vermin run collectively define a path that is parallel to and adjacent to the wall;

connecting a valve in line with the conduit, and the valve sealing the vacuum chamber in a closed position;

maintaining a vacuum inside the vacuum chamber when the valve is closed;

monitoring a space within the enclosed vermin run and adjacent to the first opening of the conduit for vermin; and opening the valve to release the vacuum along the conduit when a vermin is detected in the space being monitored, and the vermin being drawn through the conduit into a collection chamber.

2. The method of claim 1, wherein the space is monitored by an infrared sensor.

3. The method of claim 1, wherein opening the valve comprises sending a detection signal to a control box, and the control box sending a signal to the valve.

4. The method vacuum of claim 1, wherein the control box records statistics related to detection signals received.

5. The method of claim 1, wherein the vacuum is maintained by a vacuum pump.

6. The method of claim 1, wherein the collection chamber is inside the vacuum chamber.

7. The method of claim 1, wherein the collection chamber is positioned along the conduit between the vacuum chamber and the at least one first opening.

8. The method of claim 1, wherein the vacuum inside the vacuum chamber immediately prior to the valve opening is sufficient to draw the vermin through the at least one first opening of the conduit and into the vermin collection chamber.

9. The method of claim 1, comprising a plurality of vacuum chambers connected to the vacuum source.

10. The method of claim 1, comprising a plurality of conduits connected to the vacuum chamber.

* * * * *